US011070729B2

(12) United States Patent
Midorikawa et al.

(10) Patent No.: US 11,070,729 B2
(45) Date of Patent: Jul. 20, 2021

(54) IMAGE PROCESSING APPARATUS CAPABLE OF DETECTING MOVING OBJECTS, CONTROL METHOD THEREOF, AND IMAGE CAPTURE APPARATUS

(71) Applicant: CANON KABUSHIKI KAISHA, Tokyo (JP)

(72) Inventors: Keisuke Midorikawa, Tokyo (JP); Ryosuke Tsuji, Kawasaki (JP)

(73) Assignee: CANON KABUSHIKI KAiSHA, Tokyo (JP)

( * ) Notice: Subject to any disclaimer, the term of this patent is extended or adjusted under 35 U.S.C. 154(b) by 61 days.

(21) Appl. No.: 16/519,742

(22) Filed: Jul. 23, 2019

(65) Prior Publication Data
US 2020/0036895 A1    Jan. 30, 2020

(30) Foreign Application Priority Data

Jul. 27, 2018 (JP) .............................. JP2018-141635
Dec. 5, 2018 (JP) .............................. JP2018-228321
Jun. 26, 2019 (JP) .............................. JP2019-119017

(51) Int. Cl.
*H04N 5/232*  (2006.01)
*G06T 7/215*  (2017.01)

(52) U.S. Cl.
CPC ......... *H04N 5/23251* (2013.01); *G06T 7/215* (2017.01); *H04N 5/23212* (2013.01); *H04N 5/23218* (2018.08)

(58) Field of Classification Search
CPC .................................................. H04N 5/23251
See application file for complete search history.

(56) References Cited

U.S. PATENT DOCUMENTS

| 7,313,278 | B2 * | 12/2007 | Echigo | G06K 9/00711 |
| | | | | 382/190 |
| 9,665,945 | B2 * | 5/2017 | Wang | G06T 7/73 |
| 9,723,209 | B2 * | 8/2017 | Takayanagi | H04N 5/23287 |
| 2005/0163348 | A1 * | 7/2005 | Chen | G06T 7/215 |
| | | | | 382/107 |
| 2011/0310291 | A1 * | 12/2011 | Kato | H04N 5/3696 |
| | | | | 348/354 |
| 2012/0327269 | A1 * | 12/2012 | Hwang | H04N 5/23219 |
| | | | | 348/234 |

(Continued)

FOREIGN PATENT DOCUMENTS

| JP | 2015-111746 A | 6/2015 |
| JP | 2015-194915 A | 11/2015 |

OTHER PUBLICATIONS

Laurent Itti et al., "A Model of Saliency-Based Visual Attention for Rapid Scene Analysis", IEEE Transactions on Pattern Analysis and Machine Intelligence, vol. 20 Issue 11, Nov. 1998, pp. 1254-1259 Cited in Specification in paragraph [0081].

*Primary Examiner* — Cynthia Segura
(74) *Attorney, Agent, or Firm* — Cowan, Liebowitz & Latman, P.C.

(57) ABSTRACT

A disclosed image processing apparatus calculates a background vector expressing a motion of a background based on a plurality of motion vectors detected between a plurality of images. Then the image processing apparatus detects a motion vector of a moving object from the plurality of motion vectors, based on a magnitude of Euclidean distance between each of the plurality of motion vectors and the background vector.

18 Claims, 11 Drawing Sheets

(56) References Cited

U.S. PATENT DOCUMENTS

| | | | |
|---|---|---|---|
| 2015/0348254 A1* | 12/2015 | Paik | G06T 7/571 |
| | | | 382/106 |
| 2018/0063436 A1* | 3/2018 | Miyazawa | H04N 5/23216 |
| 2018/0077355 A1* | 3/2018 | Kouno | G06K 9/4604 |
| 2018/0218504 A1* | 8/2018 | Makino | G06T 7/215 |
| 2018/0293735 A1* | 10/2018 | Li | G06T 7/194 |

* cited by examiner

FIG. 10
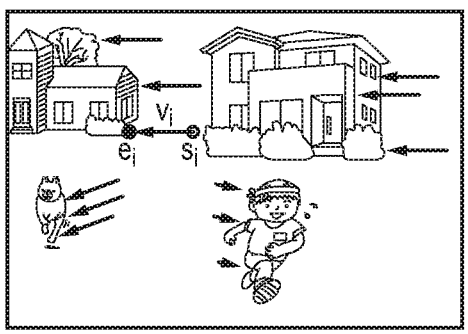
MOTION VECTOR
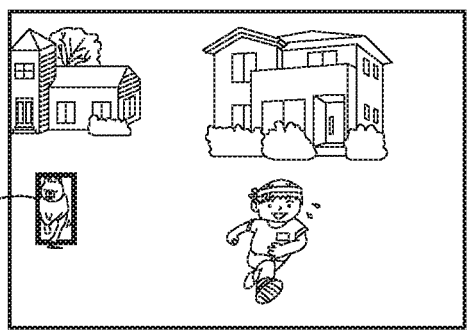
SUBJECT TRACKING RESULT OF MAIN SUBJECT
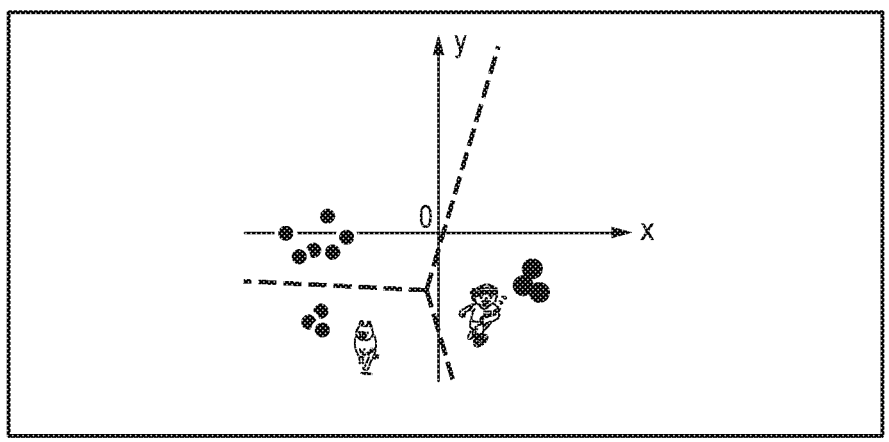
CLUSTERING
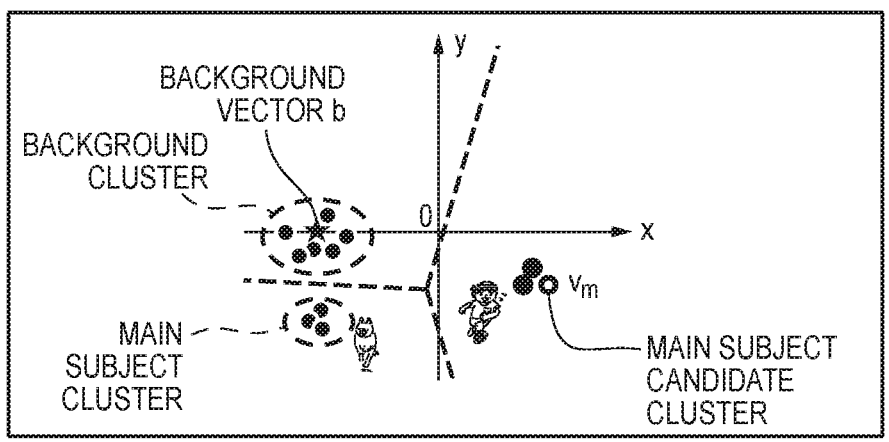
CLUSTER ASSIGNMENT

IMAGE PROCESSING APPARATUS CAPABLE OF DETECTING MOVING OBJECTS, CONTROL METHOD THEREOF, AND IMAGE CAPTURE APPARATUS

BACKGROUND OF THE INVENTION

Field of the Invention

The present invention relates to an image processing apparatus, a control method thereof, and an image capture apparatus, and specifically relates to technology for detecting moving objects.

Description of the Related Art

There has been a technique that detects a subject moving in a direction opposite to a direction in which a majority of subjects moves to, based on motion vectors between frame images of a moving image (Japanese Patent Laid-Open No. 2015-194915). There has also been a technique that determines an area in which there is a large difference between the overall motion on screen and the local motion as a main subject area (Japanese Patent Laid-Open No. 2015-111746).

In the method described in Japanese Patent Laid-Open No. 2015-194915, a moving object that moves in a direction opposite to a direction in which a majority of moving objects move is detected based on a motion vector whose difference in angle from a motion vector that indicates moving direction of a plurality of moving objects is a predetermined value or more. Therefore, when a scene is shot in which a background and a subject (moving object) move in the same direction at different speeds, in such a case where the moving object is shot while performing panning, the subject cannot be separated from the background using the method described in Japanese Patent Laid-Open No. 2015-194915.

On the other hand, with a method described in Japanese Patent Laid-Open No. 2015-111746, the main subject is determined based on a difference between the overall movement of an image and a local motion, and therefore the main subject can be recognized even in a case where the main subject and the background move in the same direction at different speeds. However, the main subject intended by a user is not always a large subject whose movement is largely different from the overall motion in screen.

SUMMARY OF THE INVENTION

The present invention has been made in view of the foregoing problem in the known technologies, and in an aspect of the present invention, provides an image processing apparatus that can detect a moving object that moves in the same direction as the background and a control method thereof, and an image capture apparatus.

According to an aspect of the present invention, there is provided an image processing apparatus comprising: one or more processors that execute a program stored in a memory, wherein the program, when executed by the one or more processors, causes the one or more processors to function as: a motion vector detection unit configured to detect a plurality of motion vectors between a plurality of images; a calculating unit configured to calculate a background vector expressing a motion of a background based on the plurality of motion vectors; and a moving object detection unit configured to detect a motion vector of a moving object from the plurality of motion vectors, based on a magnitude of Euclidean distance between each of the plurality of motion vectors and the background vector.

According to another aspect of the present invention, there is provided an image capture apparatus comprising: one or more processors that execute a program stored in a memory, wherein the program, when executed by the one or more processors, causes the one or more processors to function as: a motion vector detection unit configured to detect a plurality of motion vectors between a plurality of images; a calculating unit configured to calculate a background vector expressing a motion of a background based on the plurality of motion vectors; and a moving object detection unit configured to detect a motion vector of a moving object from the plurality of motion vectors, based on a magnitude of Euclidean distance between each of the plurality of motion vectors and the background vector; and an image sensor for capturing the plurality of images, and wherein the program further causes the one or more processors to function as a control unit configured to perform focus detection and/or exposure control based on a motion vector of a moving object detected by the motion vector detection unit.

According to a further aspect of the present invention, there is provided a control method of an image processing apparatus comprising: detecting a plurality of motion vectors between a plurality of images; calculating a background vector expressing a motion of a background based on the plurality of motion vectors; and detecting a motion vector of a moving object from the plurality of motion vectors, based on a magnitude of Euclidean distance between each of the plurality of motion vectors and the background vector.

According to another aspect of the present invention, there is provided a non-transitory computer-readable medium storing a program for causing a computer to function as an image processing apparatus comprising: a motion vector detection unit configured to detect a plurality of motion vectors between a plurality of images; a calculating unit configured to calculate a background vector expressing a motion of a background based on the plurality of motion vectors; and a moving object detection unit configured to detect a motion vector of a moving object from the plurality of motion vectors, based on a magnitude of Euclidean distance between each of the plurality of motion vectors and the background vector.

According to a further aspect of the present invention, there is provided an image processing apparatus comprising: one or more processors that execute a program stored in a memory, wherein the program, when executed by the one or more processors, causes the one or more processors to function as: a vector detection unit configured to detect a plurality of motion vectors between a plurality of images; and a recognizing unit configured to recognize a main subject area based on the plurality of motion vectors, wherein the recognizing unit detects a motion vector, of the plurality of motion vectors, that relates to another subject that is different from a current main subject, and recognizes, if the motion vector relating to the other subject satisfies a predetermined condition, the other subject as a new main subject.

According to another aspect of the present invention, there is provided an image capture apparatus comprising: one or more processors that execute a program stored in a memory, wherein the program, when executed by the one or more processors, causes the one or more processors to function as: a vector detection unit configured to detect a plurality of motion vectors between a plurality of images; and a recognizing unit configured to recognize a main subject area based on the plurality of motion vectors, wherein the recognizing unit detects a motion vector, of the plurality of motion vectors, that relates to another subject that is different from a current main subject, and recognizes, if the motion vector relating to the other subject satisfies a predetermined condition, the other subject as a new main subject; and an image sensor for capturing the plurality of images, and wherein the program further causes the one or more processors to function as a control unit configured to perform focus detection and/or exposure control based on a motion vector of a moving object detected by the recognizing unit.

According to a further aspect of the present invention, there is provided a control method of an image processing apparatus comprising: detecting a plurality of motion vectors between a plurality of images; detecting a motion vector, of the plurality of motion vectors, that relates to another subject that is different from a current main subject; and recognizing, if the motion vector relating to the other subject satisfies a predetermined condition, the other subject as a new main subject.

According to another aspect of the present invention, there is provided a non-transitory computer-readable medium storing a program for causing a computer to function as an image processing apparatus comprising: a vector detection unit configured to detect a plurality of motion vectors between a plurality of images; and a recognizing unit configured to recognize a main subject area based on the plurality of motion vectors, wherein the recognizing unit detects a motion vector, of the plurality of motion vectors, that relates to another subject that is different from a current main subject, and recognizes, if the motion vector relating to the other subject satisfies a predetermined condition, the other subject as a new main subject.

Further features of the present invention will become apparent from the following description of exemplary embodiments with reference to the attached drawings.

BRIEF DESCRIPTION OF THE DRAWINGS

FIG. 10 is a diagram regarding clustering of motion vectors in the second embodiment.

DESCRIPTION OF THE EMBODIMENTS

Exemplary embodiments of the present invention will now be described in detail in accordance with the accompanying drawings. Note that the embodiments to be described are merely illustrative, and do not limit the scope of the present invention. For example, the following describes embodiments in which the present invention is applied to a digital camera. However, the digital camera is merely an example of an image processing apparatus to which the present invention can be applied. The present invention can be implemented in any electronic device. Such an electronic device includes an image capture apparatus, of course, such as a digital camera or a digital video camera, a personal computer, a tablet terminal, a mobile phone, a game machine, a drive recorder, a robot, a drone, or the like, but there is no limitation thereto. Note that it is not essential that an image capture function is included, and the present invention can be implemented in an electronic device that can acquire images shot in a time series such as a moving image.

Configuration of Image Capture Apparatus

Figure 1:
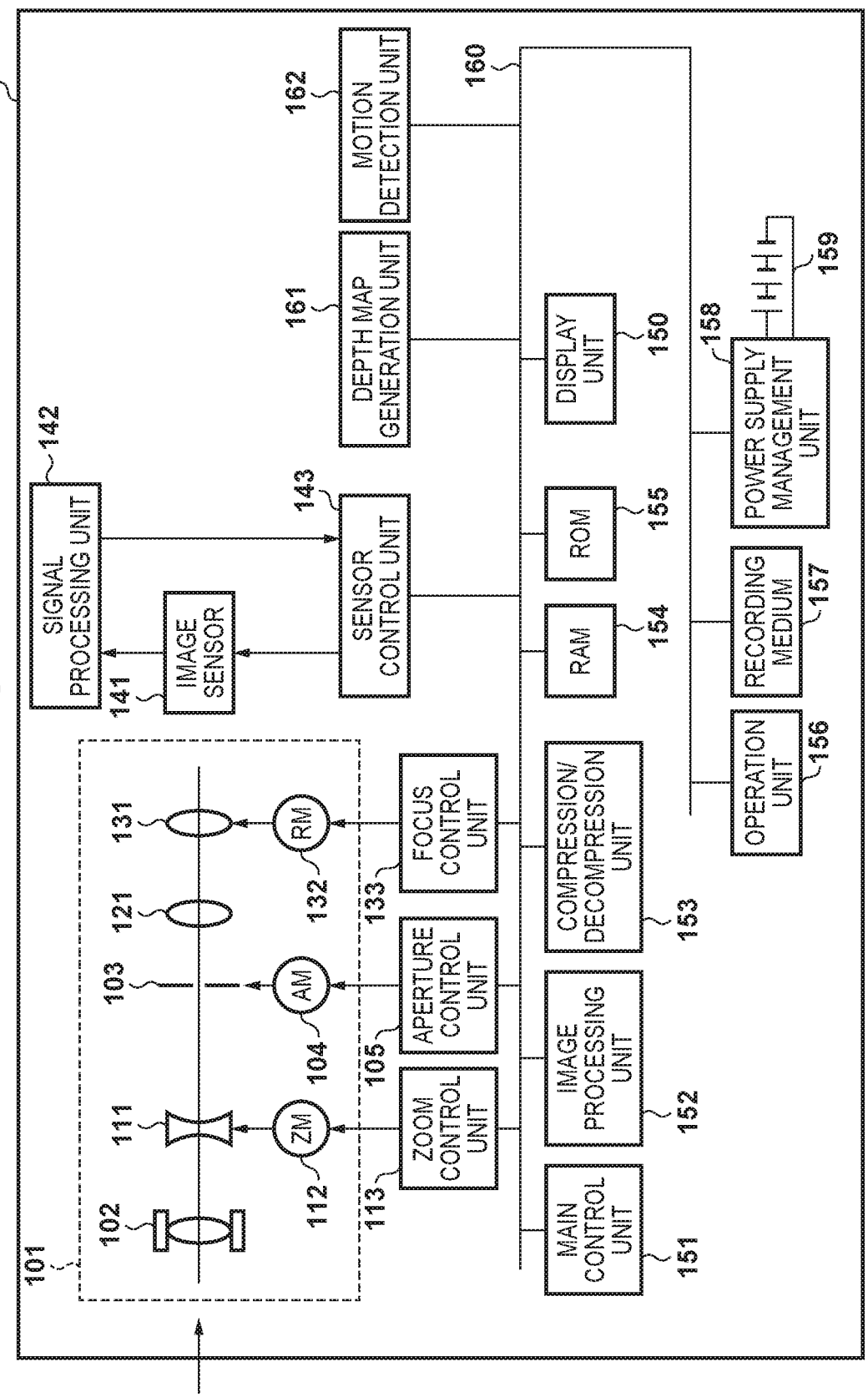
FIG. 1 is a block diagram illustrating an exemplary functional configuration of a digital camera according to an embodiment of the present invention.

FIG. 1 is a block diagram illustrating an exemplary functional configuration of a digital camera 100 according to a first embodiment. The digital camera 100 can shoot and record a moving image and a still image. The functional blocks in the digital camera 100 are communicably connected to each other via a bus 160. The operations of the digital camera 100 are realized by one or more programmable processors included in a main control unit 151 controlling the functional blocks by loading a program stored in a ROM 155, for example, to a RAM 154 and executing the program.

An image sensing lens 101 (lens unit) includes a fixed first group lens 102, a zoom lens 111, an aperture 103, a fixed third group lens 121, a focus lens 131, a zoom motor (ZM) 112, an aperture motor (AM) 104, and a focusing motor (FM) 132. The fixed first group lens 102, the zoom lens 111, the aperture 103, the fixed third group lens 121, and the focus lens 131 constitute an imaging optical system. Note that the lenses 102, 111, 121, 131 are each illustrated as one lens for convenience, but may be constituted by a plurality of lenses. Also, the image sensing lens 101 may be an image sensing lens 101 that can be removed from the image capture apparatus 100.

An aperture control unit 105 controls the operations of an aperture motor 104 in accordance with the instructions from the main control unit 151, and changes the opening size of the aperture 103. A zoom control unit 113 controls the operations of a zoom motor 112 in accordance with the instructions from the main control unit 151, and changes the focal length (angle of view) of the image sensing lens 101.

A focus control unit 133 calculates the defocus amount and the defocus direction of the image sensing lens 101 based on a phase difference between a pair of focus detection signals obtained from an image sensor 141. Also, the focus control unit 133 converts the defocus amount and the defocus direction to a driving amount and a driving direction of the focusing motor 132. The focus control unit 133 drives the focus lens 131 by controlling the operations of the focusing motor 132 based on the driving amount and the driving direction, and controls the focus state of the image sensing lens 101.

In this way, the focus control unit 133 performs automatic focus detection (AF) using a phase difference detection method, but the focus control unit 133 may perform AF using a contrast detection method based on a contrast evaluation value of an image signal obtained from the image sensor 141. Also, the focus control unit 133 may perform AF using a phase difference detection method using a focus detection signal obtained from an AF sensor provided separately from the image sensor 141. Note that in an AF operation performed by the focus control unit 133, a focus detection area can be set in an area of a main subject detected by a later-described image processing unit 152.

A subject image formed on an image forming plane of the image sensor 141 by the image sensing lens 101 is converted to an electrical signal (image signal) by a photoelectric conversion element included in each of a plurality of pixels arranged in the image sensor 141. In the present embodiment, m pixels in a horizontal direction and n pixels in a vertical direction (m and n are two or more) are arranged in an array in the image sensor 141, and each pixel is provided with two photoelectric conversion elements (photoelectric conversion regions). A sensor control unit 143 controls reading out of signals from the image sensor 141 in accordance with instructions from the main control unit 151.

The two photoelectric conversion regions included in each pixel are referred to as a region A and a region B, and an image formed by an image signal group read out from the regions A of the pixels is referred to as an A image, and an image formed by an image signal group read out from the regions B of the pixels is referred to as a B image. Also, an image obtained by adding an A image and a B image in units of pixels is referred to as an A+B image. An A image and a B image form a parallax image pair. The A+B image is used for displaying and recording. Also, the A image and the B image are used to generate a focus detection signal to be used in AF using a phase difference detection method, and to generate a depth map.

An image signal read out from the image sensor 141 is supplied to a signal processing unit 142. The signal processing unit 142 applies signal processing such as noise reduction processing, A/D conversion processing, and automatic gain control processing on an image signal, and outputs the image signal subjected to the processing to the sensor control unit 143 as image data. The sensor control unit 143 stores image data received from the signal processing unit 142 to a RAM (random access memory) 154.

When the image data saved in the RAM 154 is to be recorded, the main control unit 151 generates a data file in accordance with a recording format by adding a predetermined header or the like to the image data. Here, the main control unit 151 encodes the image data, as necessary, using a compression/decompression unit 153 and stores the encoded data to the data file. The main control unit 151 records the generated data file in a recording medium 157 such as a memory card.

Also, when image data saved in the RAM 154 is to be displayed, the main control unit 151 performs scaling on the image data using the image processing unit 152 so as to adapt to the display size of the display unit 150, and writes the image data subjected to scaling to a region (VRAM region) of the RAM 154 to be used as a video memory. The display unit 150 reads out display image data from the VRAM region of the RAM 154, and displays the image corresponding to the display image data in a display apparatus such as an LCD or an organic EL display. A detection result (such as a frame indicating a main subject area) of a main subject (moving object) detected by the image processing unit 152 is also displayed in the display unit 150.

When a moving image is being shot (in a shooting stand-by state or while a moving image being recorded), the digital camera 100 causes the display unit 150 to function as an electronic viewfinder (EVF) by instantly displaying a shot moving image in the display unit 150. A moving image and its frame image that are displayed when the display unit 150 is caused to function as an EVF are referred to as a live view image or a through-the-lens image. Also, when a still image is shot, the digital camera 100 displays a still image shot immediately before in the display unit 150 for a fixed time in order for the user to confirm the shot result. These display operations are realized by the control performed by the main control unit 151.

The compression/decompression unit 153 encodes and decodes image data. For example, when a still image or a moving image are recorded, image data and sound data are encoded using a predetermined encoding method. Also, when a still image data file or a moving image data file recorded in a recording medium 157 is reproduced, the compression/decompression unit 153 decodes the encoded data and stores the decoded data in the RAM 154.

The RAM 154 is used as a system memory for executing a program, a video memory, a buffer memory, and the like.

The ROM 155 stores a program that can be executed by a processor in the main control unit 151, various types of setting values, information specific to the digital camera 100, GUI data, and the like. The ROM 155 may be electrically rewritable.

An operation unit 156 collectively refers to an input device group such as a switch, a button, a key, and a touch panel that is used when a user inputs an instruction to the digital camera 100. The input made through the operation unit 156 is detected by the main control unit 151 through the bus 160, and the main control unit 151 controls the units in order to realize an operation in accordance with the input.

The main control unit 151 includes at least one programmable processor such as a CPU or a MPU, controls the units by loading a program stored in the ROM 155 to the RAM 154 and executing the program, and realizes the functions of the digital camera 100, for example. The main control unit 151 also executes AE processing for automatically determining the exposure conditions (shutter speed or accumulating time, F-number, ISO speed) based on information regarding subject luminance. The information regarding subject luminance can be acquired from the image processing unit 152, for example. The main control unit 151 can also determine the exposure conditions based on luminance information of an area of a specific subject such as a face of a person.

When a moving image is being shot, the main control unit 151 controls the exposure by controlling the electronic shutter speed (accumulating time) and the magnitude of a gain, while fixing the aperture 103. The main control unit 151 notifies the sensor control unit 143 of the determined accumulating time and the magnitude of a gain. The sensor control unit 143 controls the operations of the image sensor 141 such that shooting in accordance with the notified exposure conditions is performed.

A depth map generation unit 161 (distance detection unit) generates a depth map using image data saved in the RAM 154, for example. The depth map indicates a subject distance by a luminance value of a pixel, for example, and may also be referred to as a depth map image, a depth image, or the like. The depth map can be generated using a known method. For example, the depth map generation unit 161 can obtain a defocus amount (shift amount and shift direction from the in-focus position of the focus lens) at each pixel position from the image shift amount of a parallax image (aforementioned A image and B image). Because the defocus amount indicates a shift amount of an in-focus position relative to the current subject distance, the defocus amount can be regarded as distance information. Of course, the in-focus position of the focus lens is obtained based on the defocus amount, and the subject distance corresponding to the in-focus position may be obtained. Also, because the image shift amount has a one-to-one correspondence relationship with the defocus amount in a normal imaging optical system, processing according to the depth or the like can also be performed using the distribution of image shift amounts as the depth map. A parallax image may also be acquired using a multiple-lens camera such as a stereo camera as the image capture apparatus 100, or the parallax image may also be acquired from a recording medium or an external apparatus.

Also, the depth map can be generated without using the parallax image. As a result of obtaining a focus lens position at which a contrast evaluation value takes a maximum value for each pixel, the subject distance can be acquired for each pixel. Also, the distance information for each pixel can also be obtained based on a correlation between the amount of bokeh and the distance, from image data obtained by shooting a same scene a plurality of time while changing the in-focus distance and the point spread function (PSF) of the optical system. The depth map generation unit 161 may generate the depth map over the entire image, or may generate the depth map for a partial area, of the image, that is needed to perform moving object detection. The depth map generation unit 161 saves the generated depth map in the RAM 154. The image processing unit 152 refers to the depth map. Note that the depth map generation unit 161 may generate the depth map by obtaining the subject distance for each small area (pixel block) instead of obtaining the subject distance for each pixel.

Furthermore, the depth map generation unit 161 calculates reliability for each area of the depth map, and can save the reliability along with the depth map. There is no specific limitation with respect to the calculation method of the reliability. For example, when the depth map is generated using a parallax image, a correlation amount (degree of similarity) such as SAD is computed while changing a relative shift amount in order to obtain an image shift amount between parallax images, and the shift amount at which the correlation is the maximum (correlation amount is the minimum) is detected as the image shift amount. It is considered that the larger the difference between an average value and a maximum value of the calculated correlation amount is, the higher the reliability of the detected image shift amount (defocus amount) is. Therefore, the difference between an average value and a maximum value of the correlation amount calculated at each pixel position can be used as the reliability at the pixel position. Note that the depth map generation unit 161 may generate the depth map by obtaining the subject distance and its reliability for each small area (pixel block) instead of obtaining them for each pixel.

The motion detection unit 162 is constituted by an orientation sensor such as a gyroscope, an acceleration sensor, or an electronic compass, and measures the change in position and orientation of the digital camera 100. In the present embodiment, the optical axis of the image sensing lens 101 is defined as a roll axis, an axis that is orthogonal to the roll axis and is parallel with a longitudinal direction of the image sensor is defined as a pitch axis, and an axis orthogonal to the roll axis and the pitch axis is defined as a yaw axis, and the angular velocities about the yaw axis and the pitch axis are detected as the change in orientation, as an example. The motion detection unit 162 saves the detected motion in the RAM 154. The image processing unit 152 refers to the information regarding the motion detected by the motion detection unit 162.

The image processing unit 152 applies predetermined image processing on the image data stored in the RAM 154. The image processing applied by the image processing unit 152 includes so-called developing processing such as white balance adjustment processing, color interpolation (demosaic) processing, and gamma correction processing, signal format conversion processing, scaling processing, and the like, but there is no limitation thereto. Furthermore, the image processing unit 152 executes later-described moving object detection processing, and selects a moving object as the main subject. In the moving object detection processing, the image processing unit 152 can use the depth map generated by the depth map generation unit 161 and the motion detected by the motion detection unit 162 in the processing for recognizing the main subject based on moving object information.

The information regarding the area of a recognized main subject may also be used in another image processing (such as white balance adjustment processing or generation processing for generating luminance information of a subject). Note that, when the focus control unit 133 performs AF using a contrast detection method, the image processing unit 152 can generate a contrast evaluation value and supply the contrast evaluation value to the focus control unit 133. The image processing unit 152 saves image data subjected to processing, information regarding the area of a main subject, and the like to the RAM 154.

Moving Object Detection Processing

Figure 2:
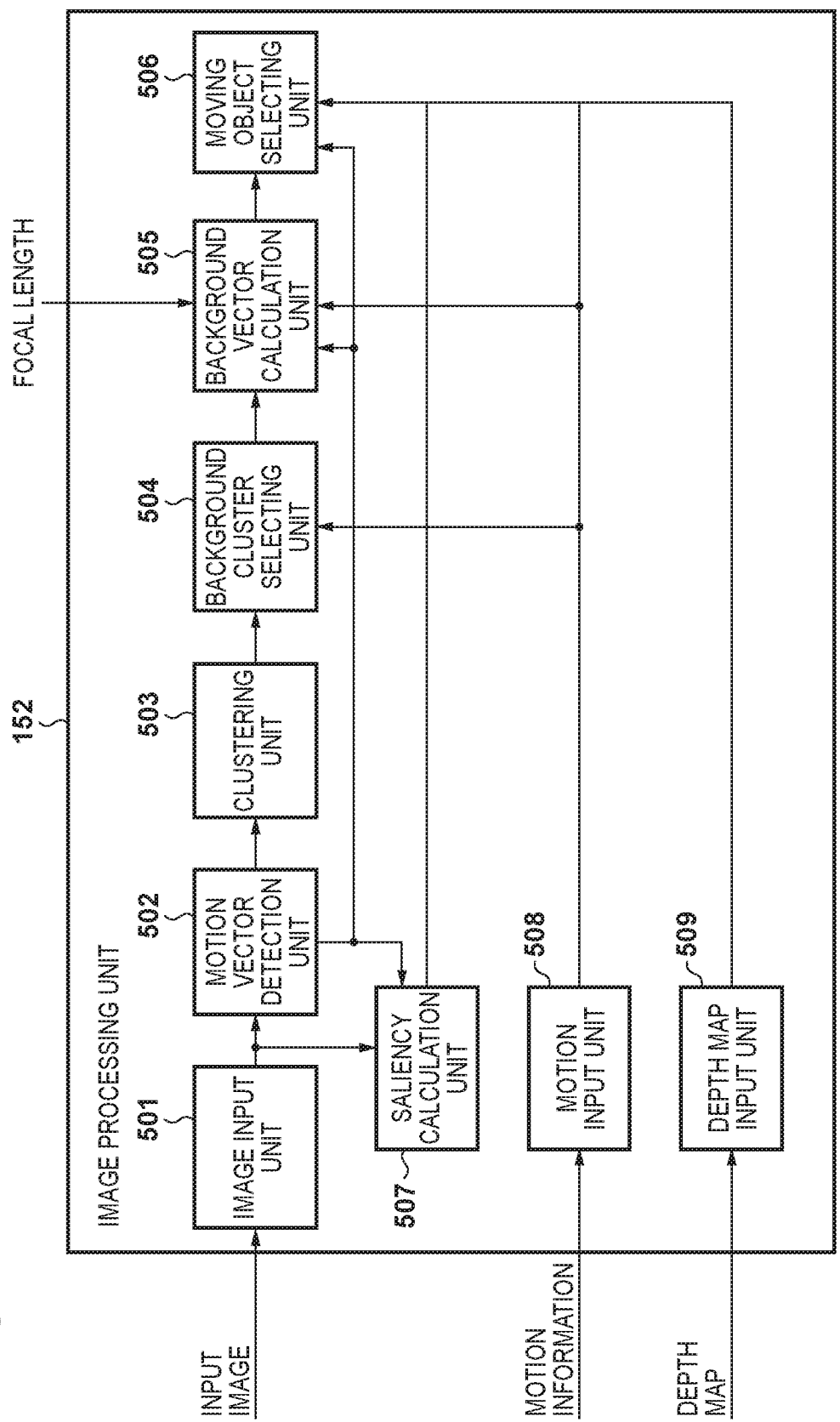
FIG. 2 is a block diagram illustrating an exemplary functional configuration regarding moving object detection of an image processing unit in the embodiment.

FIG. 2 is a schematic diagram of the image processing unit 152 illustrated by functional blocks specializing in moving object detection processing in order to describe the moving object detection processing in the present embodiment. Each of the functional blocks shown in FIG. 2 may be realized as a separate hardware circuit, or may be realized by a programmable processor included in the image processing unit 152 loading a program to a memory and executing the program.

Figure 3:
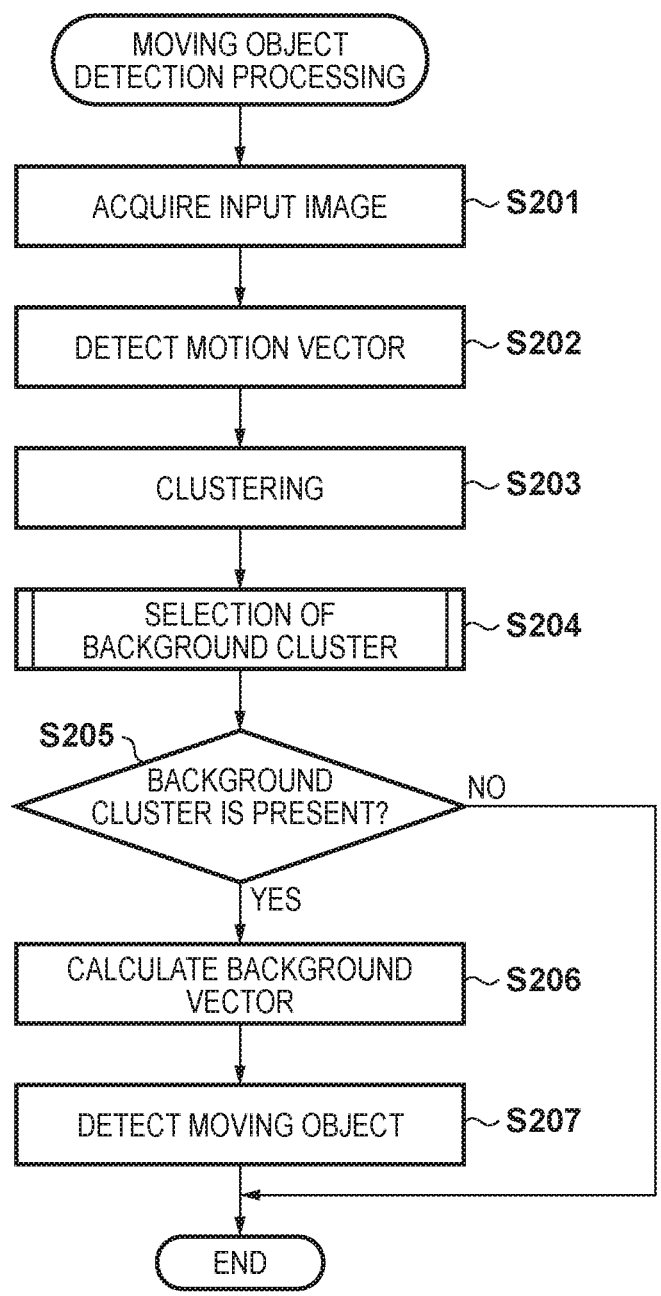
FIG. 3 is a flowchart regarding moving object detection processing in the embodiment.

FIG. 3 is a flowchart of the moving object detection processing performed by the image processing unit 152.

In step S201, the image input unit 501 acquires, from the RAM 154, two-frame input images obtained by shooting performed at different time instants. The configuration may be such that a current frame is acquired from the sensor control unit 143, and a previous frame (past frame) is acquired from the RAM 154. The image input unit 501 supplies the acquired input images to a motion vector detection unit 502 and a saliency calculation unit 507.

In step S202, the motion vector detection unit 502 detects a plurality of motion vectors between the images, with respect to the two-frame input images supplied from the image input unit 501. The motion vector can be detected using any known method, and in the present embodiment, the motion vector is detected using template matching, as an example.

That is, the motion vector detection unit 502 creates a plurality of partial images by dividing a one-frame image (denoted as frame t−1) that has been shot earlier of the two-frame images in horizontal and vertical directions. Also, the motion vector detection unit 502 performs template matching using each partial image as a template and a one-frame image (denoted as frame t) that was shot later as a reference image, and searches an area, in the reference image, that has the highest degree of similarity to the partial image. Also, the motion vector detection unit 502 determines the vector whose start point coordinates are the central point coordinates of the partial image and whose end point coordinates are the central point coordinates of the area having the highest degree of similarity to the partial image as the motion vector with respect to the partial image. In this way, the motion vector detection unit 502 detects the motion vector for each partial image of the frame t−1.

Figure 4:
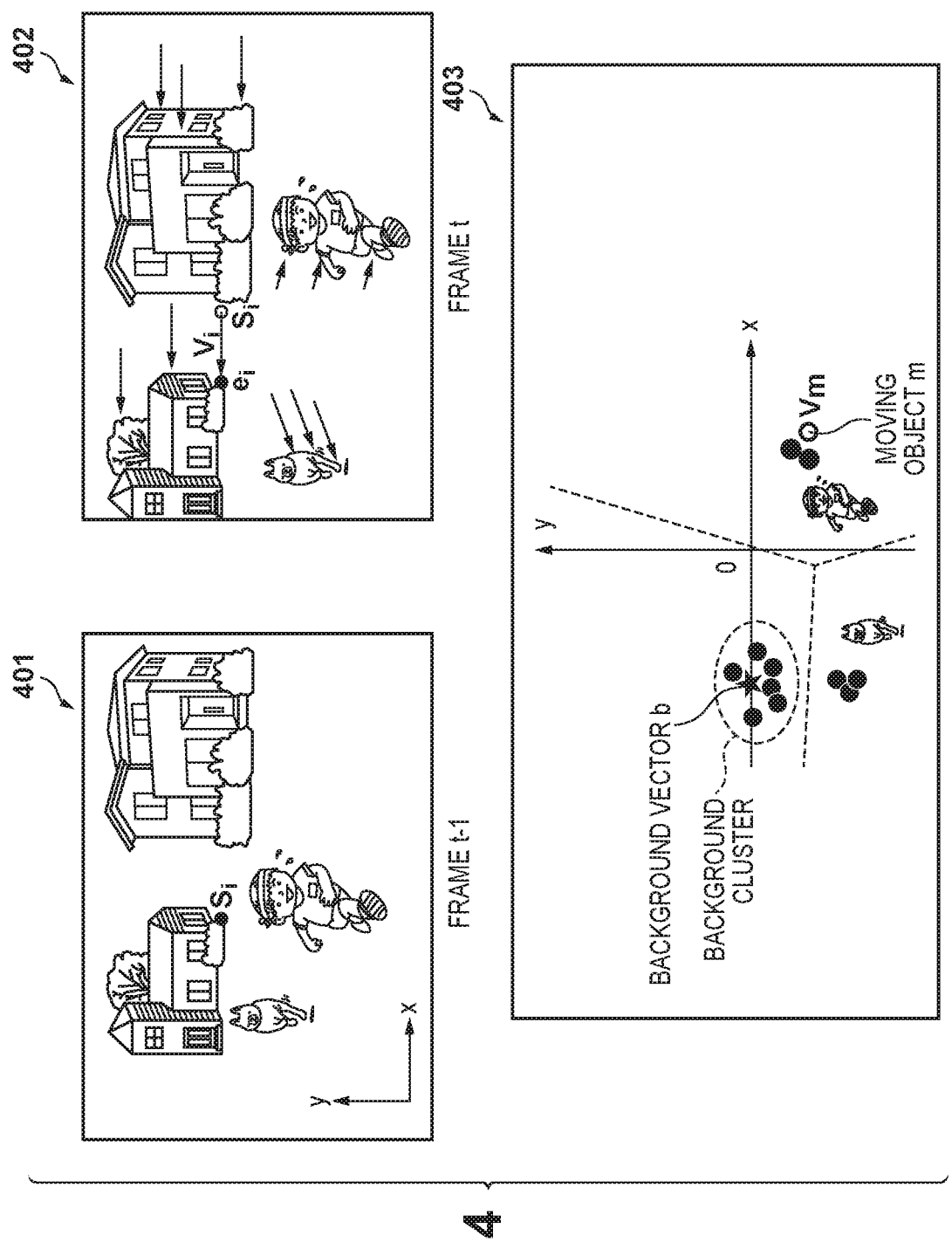
FIG. 4 is a schematic diagram illustrating a moving object detection method in the embodiment.

In FIG. 4, 401 is a diagram showing an example of a frame t−1, and 402 is a diagram showing an example of a frame t, and some motion vectors detected by template matching are indicated by the arrows. A vector $v_i$ whose start point is a point $s_i \triangleq [sx_i \ sy_i]^T$ (i=0, 1, . . . ) on the frame t−1 and whose end point is a point $s_i \triangleq [sx_i \ sy_i]^T$ (i=0, 1, . . . ) on the frame t corresponding to the point $s_i$ on the frame t−1 is calculated as follows.

$$v_i \triangleq e_i - s_i \quad (1)$$

Note that the sign in which a triangle is added above an equal sign means that the left side is defined by the right side. Also, the first component of the vector is a component in a lateral direction of an image, and the second component is a component in a longitudinal direction of the image (the same applies hereinafter). The motion vector detection unit 502 saves the detected motion vectors $v_i$ and end points $e_i$ of the motion vectors $v_i$ in the RAM 154 so as to be associated with the respective motion vectors $v_i$.

In step S203, a clustering unit 503 performs clustering with respect to a motion vector group $v_i$ detected in step S202. Any known clustering method such as the K-means method or affinity propagation can be used to perform clustering. In FIG. 4, 403 shows an example of a result of clustering using affinity propagation, which is a clustering method with which the number of clusters can be automatically determined. When a clustering method such as the K-means method, with which the number of clusters cannot be automatically determined, is used, clustering is performed after the number of clusters has been determined in some way.

In step S204, a background cluster selecting unit 504 selects a background cluster constituted by vectors in a background area from the clusters (403 in FIG. 4) obtained by performing clustering in step S203. The method of selecting the background cluster will be described later. If the background cluster is not present or cannot be selected, the background cluster selecting unit 504 determines that the background cluster is not present as the result of selecting the background cluster. The background cluster selecting unit 504 supplies the result of selecting the background cluster to a background vector calculation unit 505.

In step S205, the background vector calculation unit 505 determines whether or not a background cluster is present, and upon determining that a background cluster is present, advances the processing to step S206, and if not, ends the moving object detection processing while determining that no moving object has been detected. If the result of selecting the background cluster indicates that a background cluster is not present, the background vector calculation unit 505 can determine that a background cluster is not present.

In step S206, the background vector calculation unit 505 calculates a background vector b that expresses the motion of the background from the motion vectors that belong to the background cluster selected by the background cluster selecting unit 504. Here, it is assumed that a mean vector of the motion vectors belonging to the background cluster is calculated as the background vector b as an example, but there is no limitation thereto.

In step S207, the moving object selecting unit 506 calculates an Euclidean distance between each of all the motion vectors detected by the motion vector detection unit 502 and the background vector obtained in step S206. Then, the moving object selecting unit 506 selects a motion vector having the largest calculated Euclidean distance. Specifically, when the Euclidean distance between a motion vector $v_i$ and the background vector b is denoted as $dist_i$, and the index of a selected motion vector is m, the moving object selecting unit 506 determines the index m of the motion vector following Equations (2) and (3) described below.

$$dist_i \triangleq |b - v_i| \quad (2)$$

$$m = \mathrm{argmax}(dist_i) \quad (3)$$

Note that, if $dist_m$ (that is, the maximum Euclidean distance between the background vector b and a motion vector $v_i$) is less than a predetermined threshold value, the moving object selecting unit 506 determines that a moving object has not been detected, and ends the moving object detection processing. In this case, the result of moving object detection shows that a moving object has not been detected. On the other hand, if $dist_m$ is greater than or equal to the threshold value, the moving object selecting unit 506 outputs the image coordinates $e_m$ of an end point of the motion vector $v_m$ as a moving object detected position with respect to the frame t, and ends the moving object detection processing.

The detected moving object detected position can be used to control the operations of the image capture apparatus. For example, as a result of setting the focus detection area so as to include the moving object detected position, the focus detection of the lens unit can be controlled such that the moving object detected position is brought into focus. Also, the automatic exposure control can be controlled such that the exposure at the moving object detected position is correct exposure.

Exemplary Processing for Selecting Background Cluster 1

Figure 5:
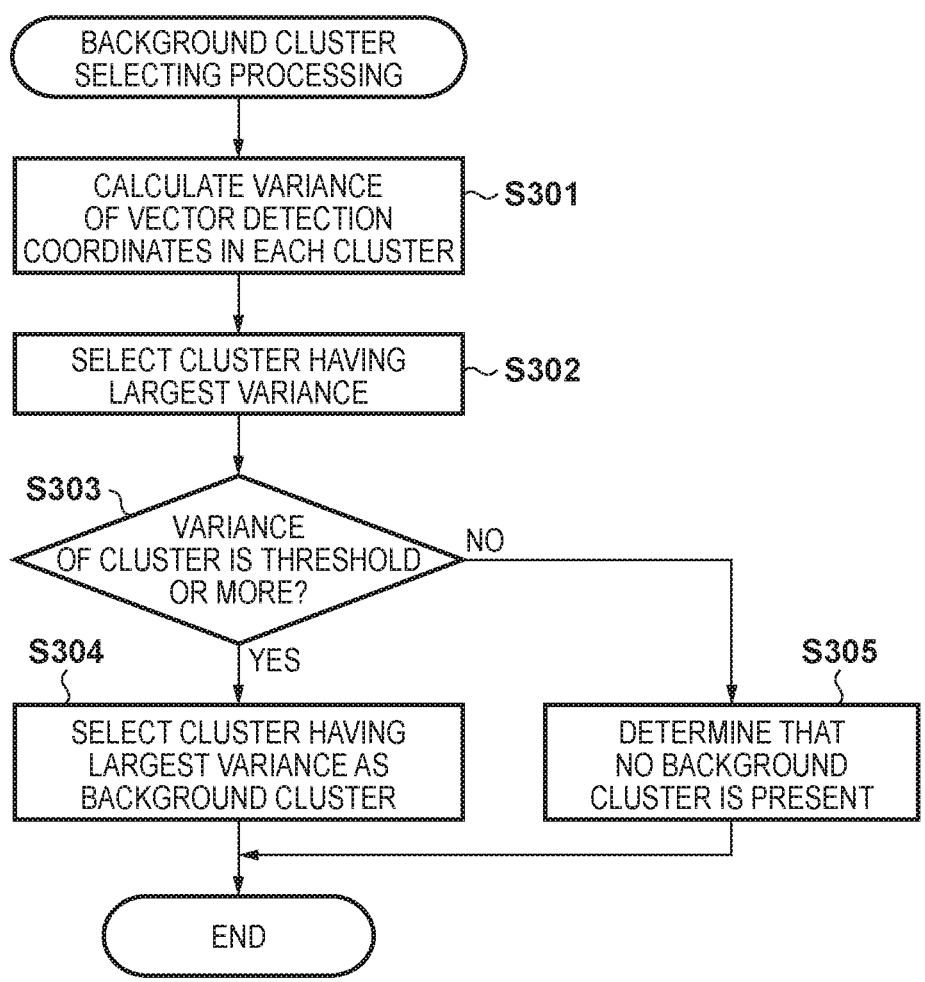
FIG. 5 is a flowchart regarding an example of a background cluster selection operation in the embodiment.

Here, an example of processing for selecting a background cluster that is performed by the background cluster selecting unit 504 in step S204 will be described using the flowchart in FIG. 5. In the example, the background cluster selecting unit 504 selects a cluster having the largest presence range, in the image, of motion vectors that constitute the cluster, as the background cluster. This can also be considered as selecting a cluster having the largest distribution range of the detected positions of motion vectors that constitute the cluster, as a background cluster.

In step S301, the background cluster selecting unit 504 calculates, with respect to each of the clusters created by the clustering unit 503, the variance of start point coordinates or end point coordinates of motion vectors that constitutes the cluster. The background cluster selecting unit 504 calculates a variance in x coordinate of the coordinates and a variance in y coordinate thereof, and calculates the variance value of the coordinate by adding the variances, for example. In the present embodiment, the background cluster selecting unit 504 calculates the variance $var_k$ of a cluster k by simply adding the variance in x coordinate and the variance in y coordinate as shown by the following Equation (4), but the variance may be obtained by weighting the variance in x coordinate and the variance in y coordinate based on the aspect ratio of the image.

$$var_k \triangleq \frac{1}{n_k}\left(\sum_{i \in k}(ex_i - \overline{ex}_k)^2 + \sum_{i \in k}(ey_i - \overline{ey}_k)^2\right) (k = 0, 1, \ldots) \quad (4)$$

Here, $n_k$ is the total number of motion vectors belonging to a cluster k, and $\overline{ex_k}$ and $\overline{ey_k}$ are respectively average values of x coordinates $ex_i$ and y coordinates $ey_i$ of end points of the motion vectors belonging to the cluster k.

In step S302, the background cluster selecting unit 504 selects a maximum value $var_K$ of the variance $var_k$ calculated in step S301 and corresponding cluster K, and stores them in an internal memory, for example.

In step S303, the background cluster selecting unit 504 determines whether or not the maximum variance value $var_K$ stored in step S302 is greater than or equal to a predetermined threshold value, and if the maximum variance value $var_K$ is greater than or equal to the threshold value, advances the processing to step S304, and if not, advances the processing to step S305.

In step S304, the background cluster selecting unit 504 selects the cluster K corresponding to the maximum variance value $var_K$ stored in step S302 as the background cluster, and ends the background cluster selection processing. Here, the cluster K corresponding to the maximum variance value $var_K$ is selected as the background cluster.

In step S305, the background cluster selecting unit 504 determines that a background cluster is not present, and ends the background cluster selection processing.

Exemplary Processing for Selecting Background Cluster 2

Figure 6:
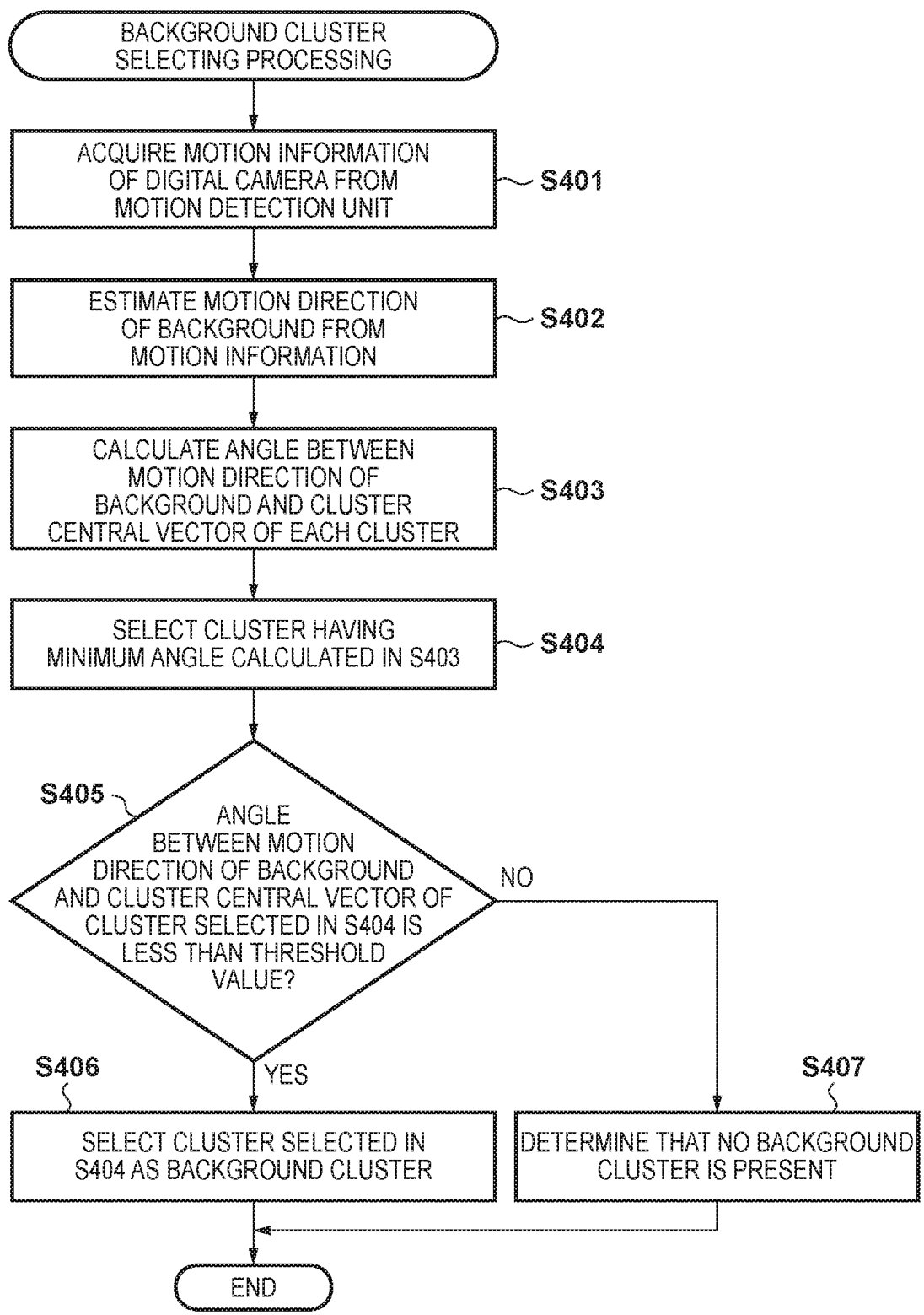
FIG. 6 is a flowchart regarding a different example of the background cluster selection operation in the embodiment.

Another example of the background cluster selection processing performed by the background cluster selecting unit 504 in step S204 will be described using the flowchart in FIG. 6. In this example, the background cluster selecting unit 504 selects the background cluster based on a motion of the digital camera 100. As a result of considering the motion of the digital camera, the background cluster can be stably selected.

In step S401, a motion input unit 508 acquires motion information (here, angular velocities about a yaw axis and a pitch axis) of the digital camera 100 from the motion detection unit 162, and supplies the motion information to the background cluster selecting unit 504.

In step S402, the background cluster selecting unit 504 estimates the motion direction of the background from the motion information received from the motion input unit 508. When the angular velocity about the yaw axis is denoted as yaw, and the angular velocity about the pitch axis is denoted as pitch, the background cluster selecting unit 504 estimates, in the present embodiment, the motion direction of the background is the direction parallel with g defined by Equation (5).

$$g \triangleq [-yaw -pitch]^T \quad (5)$$

Note that, the method described here is merely an example, and the motion direction of the background may be estimated by considering an angular velocity about a roll axis, considering a speed in the shift direction, or the like.

In step S403, the background cluster selecting unit 504 calculates angles between g in Equation (5) and cluster central vectors of the respective clusters. Here, the cluster central vector is a representative vector of the motion vectors $v_i$ that constitute the corresponding cluster, and may be a mean vector, for example.

In step S404, the background cluster selecting unit 504 selects the minimum value $\theta_K$ of the angles calculated in step S403 and the corresponding cluster K, and stores them in an internal memory, for example.

In step S405, the background cluster selecting unit 504 determines whether or not $\theta_K$ selected in step S404 is less than a predetermined threshold value, and if it is determined that $\theta_K$ is less than the predetermined threshold value, advances the processing to step S406, and if not, advances the processing to step S407.

In step S406, the background cluster selecting unit 504 selects the cluster K selected in step S404 as the background cluster, and ends the background cluster selection processing.

In step S407, the background cluster selecting unit 504 determines that a background cluster is not present, and ends the background cluster selection processing.

Another Example of Moving Object Detection Processing 1

Next, another example of the moving object detection processing in step S207 will be described. In this example, the moving object selecting unit 506 can select an area that is more likely to be the subject by applying the moving object detection processing to a limited area that is visually salient (salient area) in the image.

The saliency calculation unit 507 calculates saliency at the end point coordinate $e_i$ of each of the motion vectors detected by the motion vector detection unit 502 with respect to a frame t supplied from the image input unit 501. The saliency calculation unit 507 can calculate the saliency using any known saliency calculation method such as the saliency described in Laurent Itti, Christof Koch, and Ernst Niebur, "A Model of Saliency-Based Visual Attention for Rapid Scene Analysis", IEEE Transactions on Pattern Analysis and Machine Intelligence archive Volume 20 Issue 11, November 1998 Pages 1254-1259, for example. The saliency calculation unit 507 stores the calculated saliency in the RAM 154 in association with the motion vector.

In step S207, the moving object selecting unit 506 limits the motion vectors of which the Euclidean distance from the background vector b are to be calculated to those having saliency that is greater than or equal to a predetermined threshold value. With this, the moving object detection can be applied while limiting the area to the salient area.

Another Example of Moving Object Detection Processing 2

Next, yet another example of the moving object detection processing in step S207 will be described. In this example, the moving object selecting unit 506 applies the moving object detection by prioritizing areas based on closeness to the digital camera 100. With this, when a plurality of moving objects are present, it is possible to detect the main subject by prioritizing a moving object that is closer.

A depth map input unit 509 acquires a depth map generated by the depth map generation unit 161 with respect to the frame t, and supplies the depth map to the moving object selecting unit 506.

In step S207, the moving object selecting unit 506 limits the motion vectors of which the Euclidean distance from the background vector b are to be calculated to motion vectors with respect to which the subject distance corresponding to the end point coordinate $e_i$ thereof is less than a threshold value. With this, the moving object detection can be applied while limiting the area to an area closer to the digital camera 100.

Alternatively, the moving object selecting unit 506 may determine, from among the motion vectors whose Euclidean distance from the background vector b is greater than or equal to the threshold value, an end point coordinate $e_i$ of the motion vector having the minimum subject distance corresponding to the end point coordinate $e_i$, as the moving object detected position.

Figure 7:
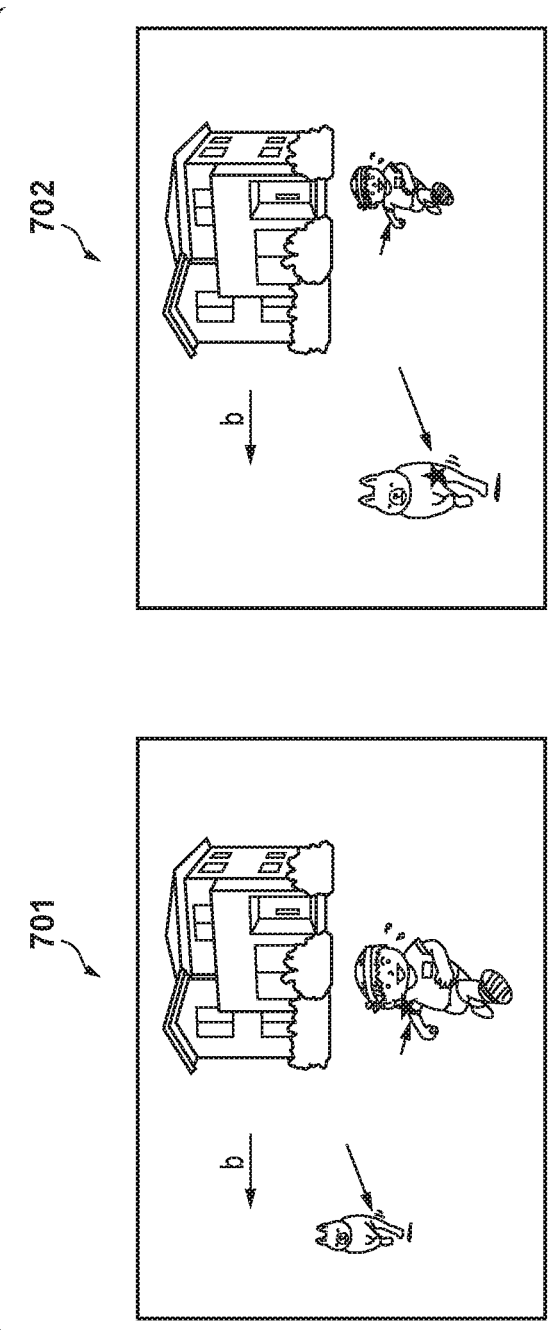
FIG. 7 is a schematic diagram illustrating moving object detection using a depth map in the embodiment.

The latter example will be described using FIG. 7. In FIGS. 7, 701 and 702 schematically illustrate a frame image including a person and a dog as moving objects. It is assumed that, in each frame image, the Euclidean distances between the motion vectors with respect to the person and the dog and a background vector b are greater than or equal to the threshold value, and the motion vectors can be estimated as motion vectors of moving objects. When, an end point coordinate $e_i$ of the motion vector, of the motion vectors whose Euclidean distance is greater than or equal to the threshold value, with respect to which the subject distance corresponding to the end point coordinate $e_i$ is the minimum is determined as the moving object detected position, the end point of the motion vector of the person shown in 701 of FIG. 7 and the end point of the motion vector of the dog shown in 702 of FIG. 7 are selected as the moving object detected position.

Another Example of Background Vector Calculation

In the configuration described above, the background cluster is selected by clustering motion vectors, and the background vector b is calculated from motion vectors that constitute the background cluster. However, the background vector may be calculated using the motion of the digital camera 100 and the focal length (angle of view) of the image sensing lens 101 without performing clustering. With this, computation load when clustering of motion vectors is performed can be removed. Also, this method is useful in a scene in which color does not largely change in the background area, and it is difficult to detect motion vectors.

The background vector calculation unit 505 acquires the focal length f [mm] of the image sensing lens 101 (imaging optical system) when a frame t was shot via the zoom control unit 113. Also, the motion input unit 508 acquires the motion information (angular velocities about the yaw axis and pitch axis, here) of the digital camera 100 from the motion detection unit 162, and supplies the motion information to the background vector calculation unit 505.

The background vector calculation unit 505 can calculate the background vector b following Equation (6) described below.

$$b = AfT[-\text{yaw} - \text{pitch}]^T \quad (6)$$

Here, A is a coefficient for converting the actual distance [mm] on the image sensor 141 to a distance [pixel] in the image coordinate system, is information of the image sensor that is determined by the structure of the digital camera 100 and the image size, and is stored in the ROM 155 in advance, for example. T is a shooting interval [sec] between a frame t−1 and a frame t.

The background vector calculation unit 505 supplies the calculated background vector b to the moving object selecting unit 506. The processing performed by the moving object selecting unit 506 may be that described above.

As described above, according to the present embodiment, as a result of selecting a motion vector of a moving object based on the Euclidean distance between each motion vector and a background vector, even a moving object that moves in the same direction as the background can be detected.

Second Embodiment

Next, a second embodiment of the present invention will be described. The present embodiment relates to an image processing apparatus that can recognize, when a main subject is recognized using motion information, the main subject intended by a user with a high probability, and a control method thereof. In the following, constituent elements and operations similar to or the same as those in the first embodiment are given the same reference numerals, and redundant description will be omitted.

Figure 8:
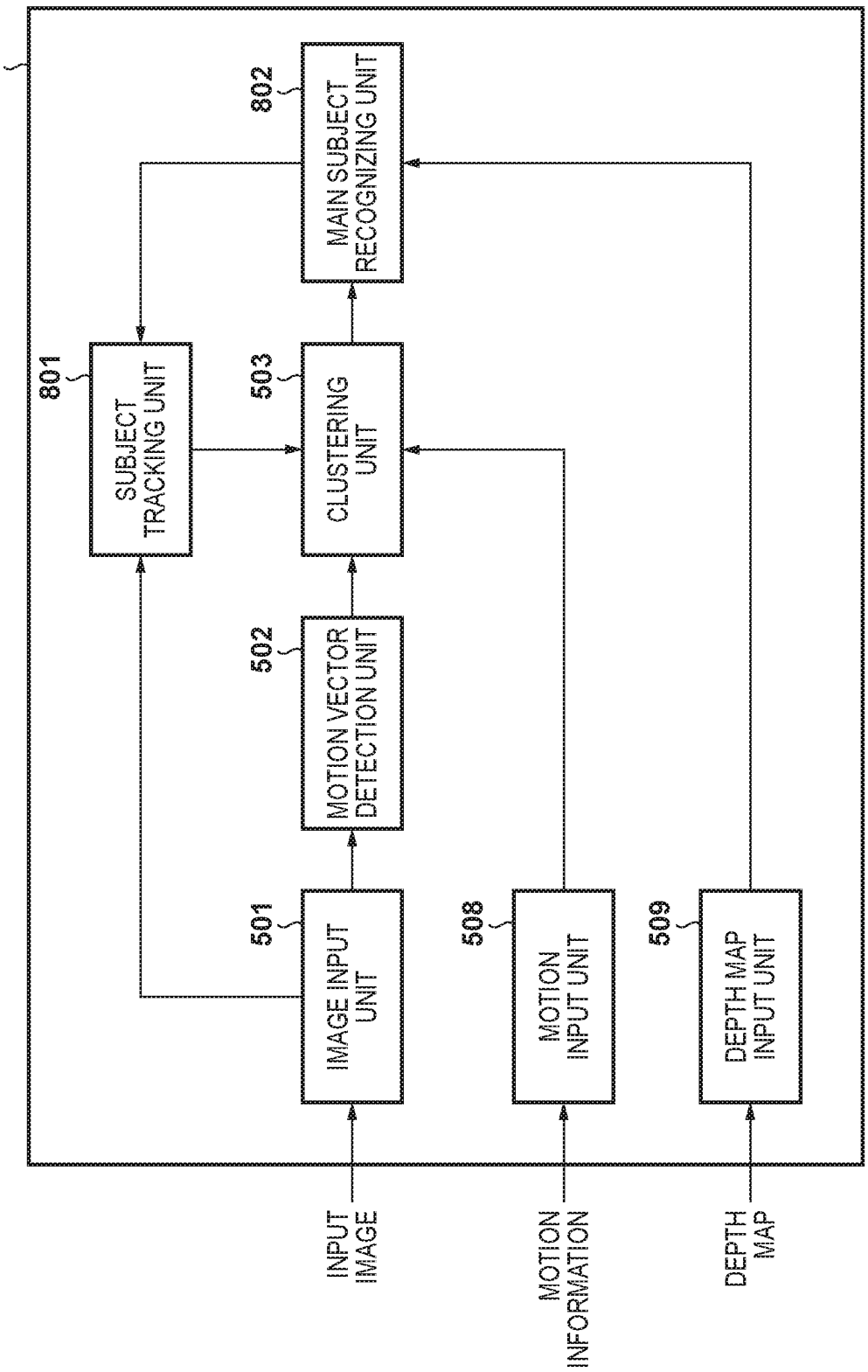
FIG. 8 is a block diagram illustrating an exemplary functional configuration regarding moving object detection of an image processing unit in a second embodiment.

FIG. 8 is a schematic diagram of an image processing unit 152 illustrated by functional blocks specializing in moving object detection processing in order to describe the moving object detection processing in the present embodiment. Each of the functional blocks shown in FIG. 8 may be realized as a separate hardware circuit, or may be realized by a programmable processor included in the image processing unit 152 loading a program to a memory and executing the program.

An image input unit 501 acquires, from a RAM 154, two-frame input images obtained by shooting performed at different time instants. The configuration may be such that a current frame is acquired from a sensor control unit 143, and a previous frame (past frame) is acquired from the RAM 154.

A motion vector detection unit 502 detects a plurality of motion vectors between the input images acquired by the image input unit 501. The motion vectors can be detected using any known method, and in the present embodiment, the motion vectors are detected using template matching, as an example.

A clustering unit 503 classifies the plurality of motion vectors detected by the motion vector detection unit 502 into at least the following three clusters.

Background cluster: motion vectors of the overall image (vectors based on the motion of the image capture apparatus 100, for example)

Main subject cluster: motion vectors regarding a main subject of a previous frame or older Main subject candidate cluster: vectors whose distance from motion vectors belonging to the background cluster are large (vectors regarding objects that move fast in a real space)

As a result of the motion vectors being classified into at least these three clusters, the main subject can be recognized considering the motion information of the current main subject, in main subject recognition processing based on motions. Therefore, the probability of correctly recognizing the main subject intended by the user can be improved. For example, if the current main subject is stationary in real space, another subject that is moving can be recognized as the new main subject. Alternatively, if the current main subject is moving in real space, it is also possible that the recognition result of the main subject will not be changed even if another moving object is present.

A main subject recognizing unit 802 recognizes a main subject area in the current frame based on the result of clustering performed by the clustering unit 503. Information of the main subject area recognized by the main subject recognizing unit 802 can be used in various types of processing such as automatic exposure control and automatic focus detection. Also, a subject tracking unit 801 executes subject tracking processing in which a main subject area in an input image of a next frame and onward is searched by performing matching processing using the main subject area recognized by the main subject recognizing unit 802 as a template. The result of subject tracking performed by the subject tracking unit 801 (information regarding the main subject area in an image) is also supplied to the clustering unit 503.

Another information acquired by the image capture apparatus 100 other than the input image acquired by the image input unit 501 may be used in the main subject recognition processing based on motion information. For example, information regarding motion detected by a motion detection unit 162 is input to the clustering unit 503 via a motion input unit 508, and the information can be used to estimate the background cluster. Also, a depth map obtained by a depth map generation unit 161 is input to the main subject recognizing unit 802 via a depth map input unit 509, and the depth map can be used in the main subject recognition processing.

Main Subject Recognition Processing

Figure 9:
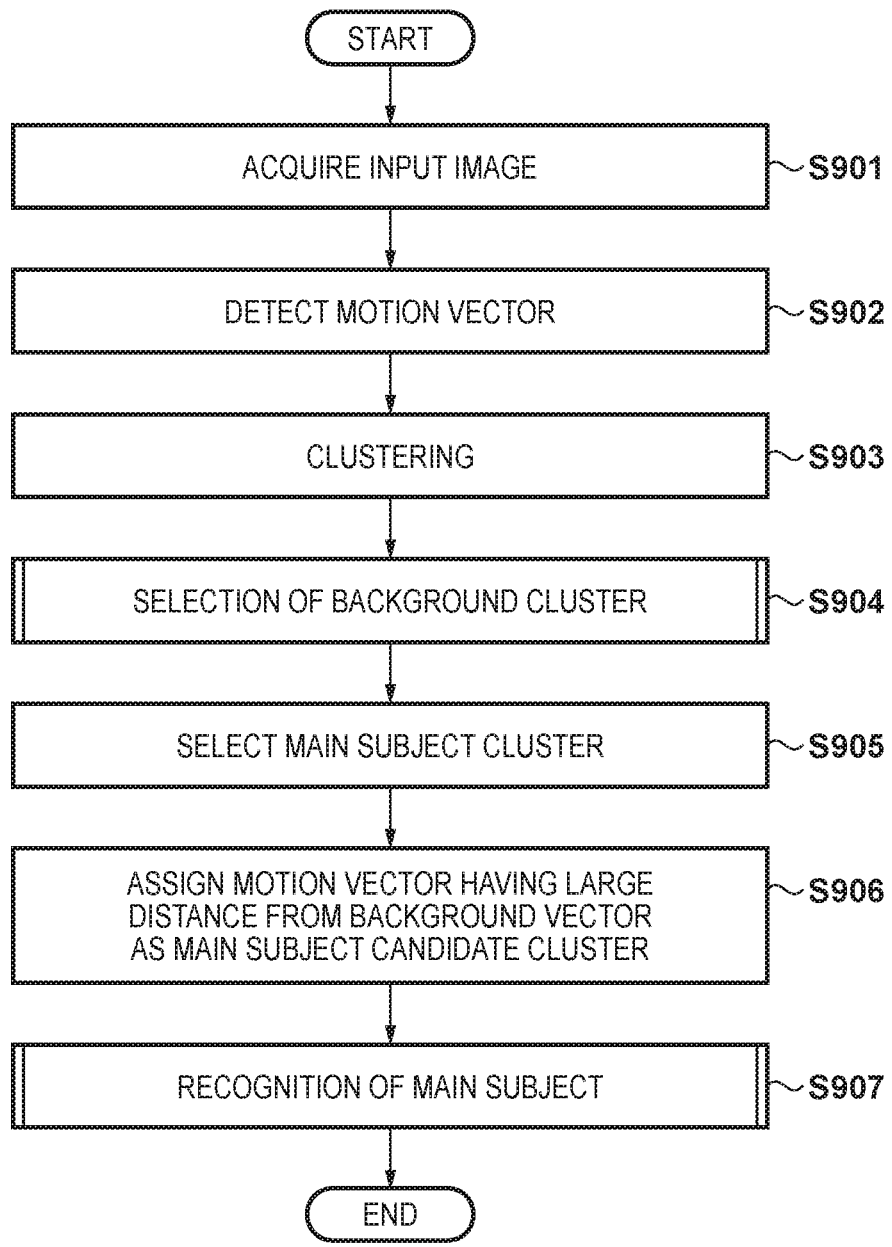
FIG. 9 is a flowchart regarding operations of the image processing unit in the second embodiment.

FIG. 9 is a flowchart of main subject recognition processing performed by the image processing unit 152. In step S901, the image input unit 501 acquires two-frame input images shot at different time instants.

Motion Vector Detection

In step S902, the motion vector detection unit 502 detects a plurality of motion vectors between the two-frame input images acquired by the image input unit 501. The motion vector detection unit 502 creates a plurality of partial images by dividing a one-frame image (denoted as frame t−1) that has been shot earlier of the two-frame images in a horizontal and vertical directions. Also, the motion vector detection unit 502 performs template matching using each partial image as a template and a one-frame image (denoted as frame t) that was shot later as a reference image, and searches an area, in the reference image, that has the highest degree of similarity to the partial image. Also, the motion vector detection unit 502 determines the vector whose start point coordinates are the central point coordinates of the partial image and whose end point coordinates are the central point coordinates of the area having the highest degree of similarity to the partial image as the motion vector with respect to the partial image. In this way, the motion vector detection unit 502 detects the motion vector for each partial image of the frame t−1, similarly to the first embodiment. Then the motion vector detection unit 502 saves the detected motion vectors $v_i$ and end points $e_i$ of the motion vectors $v_i$ in the RAM 154 so as to be associated with the respective motion vectors $v_i$.

Clustering

Processing from step S903 to step S906 relates to clustering processing of the motion vectors performed by the clustering unit 503.

In step S903, the clustering unit 503 performs clustering with respect to a motion vector group $v_i$ detected in step S902. Any known clustering method such as the K-means method or affinity propagation can be used to perform clustering, similarly to the first embodiment.

The current-frame image, and the motion vectors detected between the current frame and the previous frame are schematically shown in 1001 of FIG. 10. In FIG. 10, 1003 shows an example of a result of clustering these motion vectors using affinity propagation, which is a clustering method with which the number of clusters can be automatically determined. When a clustering method such as the K-means method with which the number of clusters cannot be automatically determined is used, clustering is performed after the number of clusters has been determined in some way.

Selection of Background Cluster

In step S904, the clustering unit 503 selects a background cluster constituted by vectors in a background area from the clusters (shown in 1003 of FIG. 10) obtained by performing clustering in step S903, the result being shown in 1004 of FIG. 10. The selection of the background cluster can be performed using the method described using FIGS. 5 and 6 in the first embodiment.

Selection of Main Subject Cluster

Returning to FIG. 9, in step S905, the clustering unit 503 selects a main subject cluster constituted by vectors in a main subject area, from the clusters obtained in step S903. The main subject area has been recognized by the main subject recognizing unit 802 prior to the previous frame. Also, the subject tracking unit 801 searches the main subject area in the current-frame image acquired by the image input unit 501 by performing template matching using the main subject area of the previous frame as a template, for example.

Specifically, the subject tracking unit 801 searches an area having the highest degree of similarity to the template in the current-frame image by sequentially calculating the degree of similarity between a partial area of the current-frame image and the main subject area (template) while changing the position of the partial area. The degree of similarity may be a correlation amount, for example. Also, if the degree of similarity of a partial area having the highest degree of similarity exceeds a predetermined threshold value, the subject tracking unit 801 determines that the partial area is the same image as the template (that is, the main subject area in the current-frame image).

An area 501 determined to be the main subject area by the subject tracking unit 801 is shown in 1002 of FIG. 10. The clustering unit 503 acquires information regarding the main subject area from the subject tracking unit 801, and assigns motion vectors whose end points $e_i$ are included in the main subject area to the main subject cluster (shown in 1004 of FIG. 10). Note that, when the result of subject tracking by the subject tracking unit 801 cannot be obtained, the clustering unit 503 may use an image area designated by a user as the main subject area, for example.

Selection of Main Subject Candidate Cluster

In step S906, the clustering unit 503 selects a main subject candidate cluster constituted by motion vectors that indicate a new main subject area candidate, from the clusters obtained in step S903. First, the clustering unit 503 calculates a background vector b that expresses the motion of the background from the motion vectors that belong to the background cluster selected in step S905. Here, the mean vector of the motion vectors belonging to the background cluster is calculated as the background vector b (shown in 1004 of FIG. 10), similarly to the processing performed by the background cluster selecting unit 504 of the first embodiment in step S206, but there is not limitation thereto.

Also, the clustering unit 503 calculates a Euclidean distance between each of all the motion vectors detected by the motion vector detection unit 502 and the background vector b. Then, the clustering unit 503 selects a motion vector having the largest calculated Euclidean distance. This processing is similar to the processing performed by the moving object selecting unit 506 of the first embodiment in step S207. Specifically, the clustering unit 503 determines an index m of a motion vector following Equations (2) and (3). Note that, when a plurality of motion vectors having the largest Euclidean distance are detected, a plurality of indices m are determined. Note that, if the $dist_m$ (that is, the largest Euclidean distance between the background vector b and the motion vector $v_i$) is less than a predetermined threshold value, the clustering unit 503 determines that there is no motion vector to be assigned to the main subject candidate cluster. On the other hand, if the $dist_m$ is greater than or equal to the threshold value, the clustering unit 503 assigns the motion vector $v_m$ to the main subject candidate cluster (shown in 1004 of FIG. 10).

Main Subject Recognition

Figure 11:
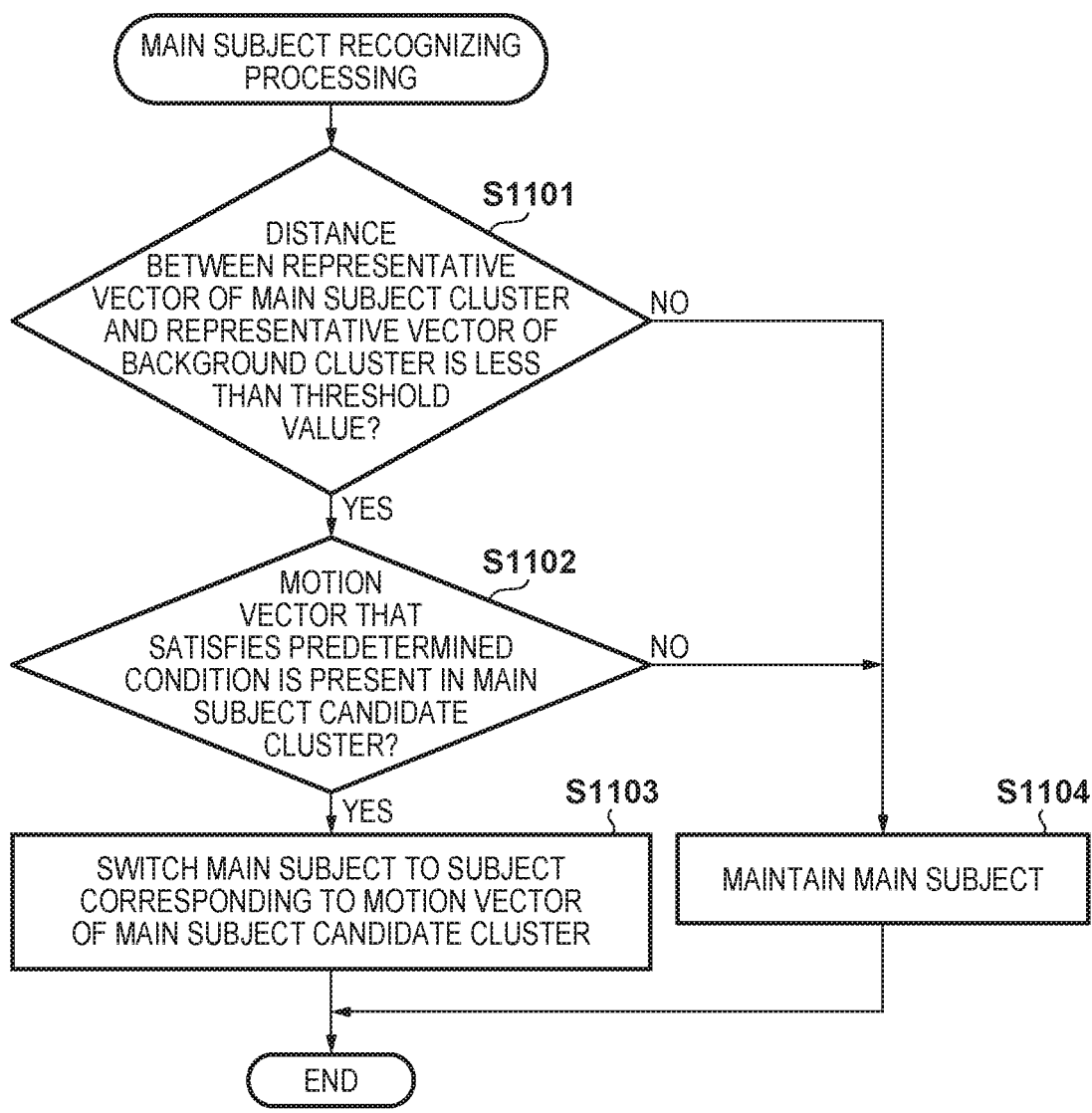
FIG. 11 is a flowchart regarding main subject recognition processing in the second embodiment.

In step S907, the main subject recognizing unit 802 recognizes the main subject based on the motion vectors belonging to the three clusters, namely the background cluster, the main subject cluster, and the main subject candidate cluster. FIG. 11 is a flowchart regarding the detail of the main subject recognition processing in step S907.

In step S1101, the main subject recognizing unit 802 calculates the Euclidean distance between a representative vector (mean vector, for example) of motion vectors belonging to the main subject cluster and a representative vector (background vector b, for example) of motion vectors belonging to the background cluster. Also, the main subject recognizing unit 802 determines whether or not the calculated Euclidean distance is less than a predetermined threshold value, and if it is determined that the calculated Euclidean distance is less than the threshold value (distance is small), advances the processing to step S1102, and if not, advances the processing to step S1104. Here, the fact that the distance is less than the threshold value indicates a state in which the motion of the main subject in the real space is small. Note that the main subject recognizing unit 802 advances, if no motion vector belongs to the main subject cluster, the processing to step S1102, and if no motion vector belongs to the background cluster, the processing to step S1104.

In step S1102, the main subject recognizing unit 802 determines whether or not a motion vector that satisfies a predetermined condition is present in the main subject candidate cluster, and if it is determined that such a motion vector is present, advances the processing to step S1103, and if not, advances the processing to step S1104. Note that, in the present embodiment, the main subject candidate cluster is constituted by one type of motion vector, and therefore the main subject recognizing unit 802 may determine whether or not a motion vector belonging to the main subject candidate cluster satisfies the predetermined condition.

In step S1103, the main subject recognizing unit 802 recognizes a partial area in the current-frame image at which motion vectors (motion vectors $v_m$, here) belonging to the main subject candidate cluster were detected as the new main subject area. That is, the main subject recognizing unit 802 determines to change the main subject. Note that, if there are a plurality of partial areas in the current-frame image at which motion vectors belonging to the main subject candidate cluster were detected, the main subject recognizing unit 802 may recognize a partial area group that is adjacent to one or more other partial areas as the main subject area.

Here, the predetermined condition in step S1102 is a condition for determining whether or not the likelihood that the main subject intended by a user is another subject corresponding to motion vectors belonging to the main subject candidate cluster rather than the current main subject is high. Then, if it is determined that the predetermined condition is satisfied, the main subject recognizing unit 802 estimates that the main subject intended by the user is another subject corresponding to motion vectors belonging to the main subject candidate cluster, and changes the main subject. Also, the main subject recognizing unit 802 notifies the subject tracking unit 801 of information regarding the new main subject area. In response to the notification, the subject tracking unit 801 updates the template to be used for tracking processing to a template based on the new main subject area.

For example, if framing of the digital camera 100 is performed so as to arrange a subject at the center of the screen, it is highly likely that the subject is the main subject intended by the user. As a result of setting a condition that motion vectors belonging to the main subject candidate cluster are motion vectors in a direction approaching the image center as the predetermined condition, when such a camera operation is performed with respect to another subject, the main subject area can be changed. As a result, a main subject intended by the user can be recognized with high probability.

Also, it is highly likely that a subject approaching the digital camera 100 is the main subject. Therefore, as a result of setting a condition that motion vectors belonging to the main subject candidate cluster are motion vectors in a direction approaching the digital camera 100 as the predetermined condition, when another subject is approaching the digital camera 100, the main subject area can be changed. In this case as well, a main subject intended by the user can be recognized with high probability.

Note that whether or not the motion vector is a motion vector in a direction approaching the camera can be determined based on a depth map acquired by the depth map input unit 509. A motion vector in a direction approaching the digital camera 100 is a motion vector in a direction in which the distance of another subject decreases. A motion vector, of the motion vectors belonging to the main subject candidate cluster, with respect to which the distance of the end point is smaller than that of the start point can be determined as a motion vector in a direction approaching the digital camera 100.

Note that the predetermined condition described here is merely exemplary, and any other condition for determining that it is highly likely that a subject corresponding to a motion vector belonging to the main subject candidate cluster is a main subject intended by a user can be determined. Also, there may be a plurality of predetermined conditions. In this case, a configuration can be adopted in which if it is determined that at least one of the plurality of conditions is satisfied, the main subject area is changed, or if it is determined that all of the plurality of conditions are satisfied, the main subject area is changed.

In step S1104, the main subject recognizing unit 802 determines that the main subject area is maintained (not to be changed). For example, if the Euclidean distance between the representative vector of motion vectors belonging to the main subject cluster and the representative vector of motion vectors belonging to the background cluster is greater than or equal to a threshold value, it is considered that the main subject is significantly moving. In this case, the current main subject is not changed. Also, if a moving subject is not detected, because the aforementioned $dist_m$ is less than the threshold value, and no motion vector is assigned to the main subject candidate cluster, the current main subject area is maintained.

As described above, in the present embodiment, when a main subject is recognized based on motion vectors detected between frames, motion vectors of a subject that is different from the current main subject are considered. Also, if the main subject intended by a user is estimated to be a subject that is different from the current main subject based on the motion vector of the different subject, for example, the main subject is changed. Therefore, the likelihood that a main subject intended by a user can be recognized can be improved.

Note that, in the present embodiment, the main subject candidate cluster is a cluster constituted only by motion vectors whose Euclidean distance from the background vector b is largest. However, the main subject candidate cluster may be defined using another method. For example, the main subject candidate cluster may be a cluster constituted by motion vectors with respect to which the difference in size and direction from a motion vector having the largest Euclidean distance from the background vector b is less than a threshold value, the cluster including the motion vector having the largest Euclidean distance from the background vector b.

Also, in step S1101, if the Euclidean distance between the representative vector of motion vectors belonging to the main subject cluster and the representative vector of motion vectors belonging to the background cluster is less than the threshold value, the processing is advanced to step S1102. However, even if the Euclidean distance is less than the threshold value, if it is determined that a main subject is approaching based on the depth map, the processing may be advanced to S1104, instead of step S1102.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-141635, filed on Jul. 27, 2018, No. 2018-228321, filed on Dec. 5, 2018, and No. 2019-119017, filed on Jun. 26, 2019, which are hereby incorporated by reference herein in their entirety.

What is claimed is:

1. An image processing apparatus comprising:
one or more processors that execute a program stored in a memory, wherein the program, when executed by the one or more processors, causes the one or more processors to function as:
a motion vector detection unit configured to detect a plurality of motion vectors between a plurality of images;
a motion detection unit configured to detect motion of the image processing apparatus;
a clustering unit configured to generate one or more clusters by clustering the plurality of motion vectors;
a selecting unit configured to select a background cluster from the one or more clusters generated by the clustering unit;
a calculating unit configured to calculate a background vector from motion vectors that constitute the background cluster; and
a moving object detection unit configured to detect a motion vector of a moving object from the plurality of motion vectors, based on a magnitude of Euclidean distance between each of the plurality of motion vectors and the background vector,
wherein:
the selecting unit selects, from the one or more clusters generated by the clustering unit, a cluster having a minimum angle between a representative vector and a motion direction of the background estimated from the motion of the image processing apparatus detected by the motion detection unit, as the background cluster.

2. An image processing apparatus comprising:
one or more processors that execute a program stored in a memory, wherein the program, when executed by the one or more processors, causes the one or more processors to function as:
a motion vector detection unit configured to detect a plurality of motion vectors between a plurality of images;
a motion detection unit configured to detect motion of the image processing apparatus;
an acquiring unit configured to acquire a focal length of an imaging optical system and information of an image sensor that are used to capture the plurality of images;
a calculating unit configured to calculate a background vector expressing a motion of a background, wherein the calculating unit calculates the background vector from the motion of the image processing apparatus, the focal length, the information of the image sensor, and shooting intervals of the plurality of images; and
a moving object detection unit configured to detect a motion vector of a moving object from the plurality of motion vectors, based on a magnitude of Euclidean distance between each of the plurality of motion vectors and the background vector.

3. The image processing apparatus according to claim 2, wherein the program, when executed by the one or more processors, further causes the one or more processors to function as:
a saliency calculating unit configured to calculate saliency of an image at an end point coordinate of the motion vector,
wherein the moving object detection unit detects the motion vector of a moving object from motion vectors, of the plurality of motion vectors, that have the saliency of an image at the end point coordinate being greater than or equal to a threshold value.

4. The image processing apparatus according to claim 2, wherein the program, when executed by the one or more processors, further causes the one or more processors to function as:
a distance detection unit configured to detect a subject distance at a pixel position, wherein the moving object detection unit detects the motion vector of a moving object from motion vectors, of the plurality of motion vectors, that have the subject distance at a pixel position at an end point coordinate being less than a threshold value.

5. The image processing apparatus according to claim 2, wherein the program, when executed by the one or more processors, further causes the one or more processors to function as:
a distance detection unit configured to detect a subject distance at a pixel position,
wherein the moving object detection unit detects a motion vector, from the plurality of motion vectors, whose Euclidean distance is greater than or equal to a threshold value and with respect to which the subject distance at a pixel position at an end point coordinate is minimum, as the motion vector of a moving object.

6. An image capture apparatus comprising:
one or more processors that execute a program stored in a memory, wherein the program, when executed by the one or more processors, causes the one or more processors to function as:
a motion vector detection unit configured to detect a plurality of motion vectors between a plurality of images;
a motion detection unit configured to detect motion of the image processing apparatus;
an acquiring unit configured to acquire a focal length of an imaging optical system and information of an image sensor that are used to capture the plurality of images;
a calculating unit configured to calculate a background vector expressing a motion of a background, wherein the calculating unit calculates the background vector from the motion of the image processing apparatus, the focal length, the information of the image sensor, and shooting intervals of the plurality of images; and
a moving object detection unit configured to detect a motion vector of a moving object from the plurality of motion vectors, based on a magnitude of Euclidean distance between each of the plurality of motion vectors and the background vector; and
an image sensor for capturing the plurality of images, and
wherein the program further causes the one or more processors to function as a control unit configured to perform focus detection and/or exposure control based on a motion vector of a moving object detected by the motion vector detection unit.

7. A control method of an image processing apparatus comprising:
detecting a plurality of motion vectors between a plurality of images;
detecting motion of the image processing apparatus;
acquiring a focal length of an imaging optical system and information of an image sensor that are used to capture the plurality of images;
calculating a background vector expressing a motion of a background, from the motion of the image processing apparatus, the focal length, the information of the image sensor, and shooting intervals of the plurality of images; and
detecting a motion vector of a moving object from the plurality of motion vectors, based on a magnitude of Euclidean distance between each of the plurality of motion vectors and the background vector.

8. A non-transitory computer-readable medium storing a program for causing a computer to function as an image processing apparatus comprising:
a motion vector detection unit configured to detect a plurality of motion vectors between a plurality of images;
a motion detection unit configured to detect motion of the image processing apparatus;
an acquiring unit configured to acquire a focal length of an imaging optical system and information of an image sensor that are used to capture the plurality of images;
a calculating unit configured to calculate a background vector expressing a motion of a background, wherein the calculating unit calculates the background vector from the motion of the image processing apparatus, the focal length, the information of the image sensor, and shooting intervals of the plurality of images; and
a moving object detection unit configured to detect a motion vector of a moving object from the plurality of motion vectors, based on a magnitude of Euclidean distance between each of the plurality of motion vectors and the background vector.

9. An image processing apparatus comprising:
one or more processors that execute a program stored in a memory, wherein the program, when executed by the one or more processors, causes the one or more processors to function as:
a vector detection unit configured to detect a plurality of motion vectors between a plurality of images; and
a recognizing unit configured to recognize a main subject area based on the plurality of motion vectors,
wherein the recognizing unit
calculates a background vector that represents motion vectors, of the plurality of motion vectors, that relates to a background, and
detects a motion vector, of the plurality of motion vectors, whose distance from the background vector is greater than or equal to a threshold value, as a motion vector relating to another subject that is different from a main subject, and
recognizes, if the motion vector relating to the other subject satisfies a predetermined condition, the other subject as a new main subject.

10. The image processing apparatus according to claim 9, wherein the recognizing unit, if Euclidean distance between a motion vector, of the plurality of motion vectors, that relates to the current main subject and the background vector is greater than or equal to a threshold value, does not change the current main subject.

11. The image processing apparatus according to claim 9, wherein the recognizing unit, if it is determined that the current main subject is approaching based on a motion vector, of the plurality of motion vectors, that relates to the current main subject, does not change the current main subject.

12. The image processing apparatus according to claim 9, wherein the program, when executed by the one or more processors, further causes the one or more processors to function as:
a clustering unit configured to generate one or more clusters by clustering the plurality of motion vectors,
wherein the recognizing unit
selects, from the one or more clusters generated by the clustering unit, a cluster having a largest distribution range of detection positions of motion vectors that constitute the cluster, as a background cluster, and calculate the background vector from motion vectors that constitute the background cluster.

13. The image processing apparatus according to claim 9, wherein the program, when executed by the one or more processors, further causes the one or more processors to function as:
  a clustering unit configured to generate one or more clusters by clustering the plurality of motion vectors, wherein the recognizing unit
    selects, from the one or more clusters generated by the clustering unit, a cluster having a largest variance in coordinate of start points or end points of motion vectors that constitute the cluster, as a background cluster, and
    calculates the background vector from motion vectors that constitute the background cluster.

14. The image processing apparatus according to claim 9, wherein the program, when executed by the one or more processors, further causes the one or more processors to function as:
  a clustering unit configured to generate one or more clusters by clustering the plurality of motion vectors; and
  a motion detection unit configured to detect motion of the image processing apparatus,
  wherein the recognizing unit
    estimates a motion direction of a background from the motion of the image processing apparatus detected by the motion detection unit,
    selects a background cluster from the one or more clusters generated by the clustering unit using the motion direction of the background, and
    calculates the background vector from motion vectors that constitute the background cluster.

15. The image processing apparatus according to claim 14, wherein the recognizing unit selects, from the one or more clusters generated by the clustering unit, a cluster having a minimum angle of a representative vector relative to the motion direction of the background, as the background cluster.

16. An image capture apparatus comprising:
  one or more processors that execute a program stored in a memory, wherein the program, when executed by the one or more processors, causes the one or more processors to function as:
    a vector detection unit configured to detect a plurality of motion vectors between a plurality of images; and
    a recognizing unit configured to recognize a main subject area based on the plurality of motion vectors,
  wherein the recognizing unit
    calculates a background vector that represents motion vectors, of the plurality of motion vectors, that relates to a background, and
    detects a motion vector, of the plurality of motion vectors, whose distance from the background vector is greater than or equal to a threshold value, as a motion vector relating to another subject that is different from a main subject, and
    recognizes, if the motion vector relating to the other subject satisfies a predetermined condition, the other subject as a new main subject; and
  an image sensor for capturing the plurality of images, and
  wherein the program further causes the one or more processors to function as a control unit configured to perform focus detection and/or exposure control based on a motion vector of a moving object detected by the recognizing unit.

17. A control method of an image processing apparatus comprising:
  detecting a plurality of motion vectors between a plurality of images;
  calculating a background vector that represents motion vectors, of the plurality of motion vectors, that relates to a background, and
  detecting a motion vector, of the plurality of motion vectors, whose distance from the background vector is greater than or equal to a threshold value, as a motion vector relating to another subject that is different from a main subject, and
  recognizing, if the motion vector relating to the other subject satisfies a predetermined condition, the other subject as a new main subject.

18. A non-transitory computer-readable medium storing a program for causing a computer to function as an image processing apparatus comprising:
  a vector detection unit configured to detect a plurality of motion vectors between a plurality of images; and
  a recognizing unit configured to recognize a main subject area based on the plurality of motion vectors,
  wherein the recognizing unit
    calculates a background vector that represents motion vectors, of the plurality of motion vectors, that relates to a background, and
    detects a motion vector, of the plurality of motion vectors, whose distance from the background vector is greater than or equal to a threshold value, as a motion vector relating to another subject that is different from a main subject, and
    recognizes, if the motion vector relating to the other subject satisfies a predetermined condition, the other subject as a new main subject.

* * * * *